US012096901B2

(12) United States Patent
Czekala

(10) Patent No.: US 12,096,901 B2
(45) Date of Patent: Sep. 24, 2024

(54) DOOR LOCK FOR A HOUSEHOLD APPLIANCE AND HOUSEHOLD APPLIANCE HAVING THE DOOR LOCK

(71) Applicant: BSH Hausgeraete GmbH, Munich (DE)

(72) Inventor: Lukasz Czekala, Wisniowa Gora (PL)

(73) Assignee: BSH Hausgeräte GmbH, Munich (DE)

( * ) Notice: Subject to any disclaimer, the term of this patent is extended or adjusted under 35 U.S.C. 154(b) by 423 days.

(21) Appl. No.: 17/590,040

(22) Filed: Feb. 1, 2022

(65) Prior Publication Data

US 2022/0257087 A1 Aug. 18, 2022

(30) Foreign Application Priority Data

Feb. 15, 2021 (EP) .................................... 21157161

(51) Int. Cl.
*A47L 15/42* (2006.01)
*D06F 39/14* (2006.01)
*E05B 17/00* (2006.01)
*E05B 47/06* (2006.01)
*E05C 19/02* (2006.01)

(52) U.S. Cl.
CPC .......... *A47L 15/4259* (2013.01); *D06F 39/14* (2013.01); *E05B 17/0025* (2013.01); *E05B 47/0603* (2013.01); *E05C 19/024* (2013.01)

(58) Field of Classification Search
CPC ......... Y10T 292/1043; Y10T 292/1047; Y10T 292/1052; Y10T 292/1051; Y10T 292/0911; Y10T 292/0926; Y10T 292/0928; Y10T 292/0945; Y10S 292/69; Y10S 292/51; E05C 3/30; E05C 19/10; E05C 19/12; E05C 19/024; E05C 3/002; E05C 17/20; E05B 17/0025; E05B 47/0603
See application file for complete search history.

(56) References Cited

U.S. PATENT DOCUMENTS

| | | | | |
|---|---|---|---|---|
| 8,702,134 B2 * | 4/2014 | Lesjak | E05C 19/026 292/341.15 |
| 9,107,560 B2 * | 8/2015 | Bauriedl | A47L 15/4259 |
| 2008/0238109 A1 * | 10/2008 | Huang | E05C 19/10 292/95 |

FOREIGN PATENT DOCUMENTS

| | | | | |
|---|---|---|---|---|
| DE | 19504796 A1 * | 8/1996 | A47L 15/4259 |
| DE | 102010051518 B4 | 4/2014 | |
| EP | 0727178 A2 * | 8/1996 | A47L 15/4259 |

* cited by examiner

*Primary Examiner* — Christine M Mills
*Assistant Examiner* — Yahya Sidky
(74) *Attorney, Agent, or Firm* — Laurence A. Greenberg; Werner H. Stemer; Ralph E. Locher

(57) ABSTRACT

An appliance door lock includes a frame at a housing and a U-shaped latch for a clamp at a door, locking along an insertion direction. The latch, moving in a lock plane along insertion direction, includes a first guiding pin and linear first guide section parallel to insertion direction with a stop for the first guiding pin at a distal end along insertion direction, and a second guiding pin and second guide section curved >90° parallel to the lock plane and outwardly from insertion direction. A spring between frame and latch biases the latch in insertion direction. The latch includes a first tab gripping the clamp and second tab pushed by the clamp, by movement along insertion direction. The second guide section provides an arrest point for the second guiding pin at a petal end along insertion direction. A household laundry care or drying appliance includes the door lock.

19 Claims, 7 Drawing Sheets

DOOR LOCK FOR A HOUSEHOLD APPLIANCE AND HOUSEHOLD APPLIANCE HAVING THE DOOR LOCK

CROSS-REFERENCE TO RELATED APPLICATION

This application claims the priority, under 35 U.S.C. § 119, of European Patent Application EP 21157161.7, filed Feb. 15, 2021; the prior application is herewith incorporated by reference in its entirety.

FIELD AND BACKGROUND OF THE INVENTION

The invention relates to a door lock having a frame configured to be fixed to a housing of a household appliance and including a latch for cooperating with a clamp attached to a door pivotably connected to the housing and for locking the door by being inserted along an insertion direction, the latch being movable in a lock plane parallel to the insertion direction and including at least one first guiding pin slidable in a linear first guide section of a guide included in the frame, the first guide section being parallel to the insertion direction and including a stop point for the first guiding pin at a distal end defined by the insertion direction, and at least one second guiding pin slidable in a curved second guide section of the guide, the second guide section curved parallel to the lock plane and outwardly from the insertion direction, and a spring device being attached between the frame and the latch and biasing the latch in the insertion direction.

Further, the invention relates to a household appliance having a housing, a door pivotable around a door axis for closing the housing, and a door locking device for locking the door including the door lock according to the invention fixed to the housing and a clamp fixed to the door for cooperating with the door lock.

U.S. Pat. No. 8,702,134 B2 discloses a door lock and a household appliance which may specifically be embodied in a laundry drying machine of the generic type as defined above. In the door lock device disclosed, the latch is carried by the door of the household appliance, and a frame fixed to the frame of the household appliance is provided with a striker device for the latch, the striker device being a pair of opposite jaws carried by the frame adjacent to each other and movable against the bias of an elastic device. The frame is provided with a guiding device for the jaws adapted to cause the jaws to be driven apart from each other in response to a traction exerted in use on the latch, the elastic device, and the guiding device are disposed so that the movement of the jaws occurs on a plane.

German Patent DE 10 2010 051 518 B4 discloses a door lock and a household appliance such as a laundry dryer including such a door lock. The door lock disclosed includes a closing spring configuration tensioned in an open position of the door lock, which relaxes when the door is closed, and a gripping unit which grips a closing element when the door is closed and releases the gripping element when the door is opened again. In an open position of the door lock, the gripping unit is in blocking engagement with a blocking element due to the force of the closing spring configuration and thus prevents relaxation of the closing spring configuration. When the door is closed, the closing element causes the gripping unit to rotate about an axis of rotation, the gripping unit coming out thereby of blocking engagement with the blocking element and enabling the closing spring configuration to be relaxed. The force of the relaxing closing spring configuration causes a subsequent closing movement of the gripping unit.

In the present context a household appliance is an appliance intended for use and operation in a private household to provide a specific and predetermined material purpose. Examples of such household appliances are laundry care machines such as laundry washers and dryers, cooling appliances such as refrigerators and freezers, cooking appliances such as ovens, microwave devices, and steamers, and dishwashers.

In many cases regulations and practice require that a door of a household appliance, while properly closing an interior wherein some treatment process such as cooling or treating laundry or dishes by water or some watery solution is being done, needs to allow the door being opened by an application of force at some appropriate amount. One reason therefor may be allowing access to the interior for adding or removing items to be processed, or ascertaining safety for a person of appropriate size who is undesirably locked into the interior.

Prior art door locks such as those referred to above are complicated in construction and manufacture, even if they provide the functions desired from them. Accordingly, there is a need for a door lock for application in a household appliance of the generic type as defined above which is simple in construction, easy to manufacture, and durable in function, and provides the required functions reliably.

SUMMARY OF THE INVENTION

It is accordingly an object of the invention to provide a door lock for a household appliance and a household appliance equipped with the door lock, which overcome the hereinafore-mentioned disadvantages of the heretofore-known door locks and appliances of this general type and in which the door lock is simple in construction, easy to manufacture, durable in function, and provides its required functions reliably.

For the purpose of accomplishing this object, the present invention provides an electrical machine of the generic type as defined in the generic part of the appended independent claim which also includes the features of the body of the independent claim.

Preferred embodiments of the invention are defined in the appended dependent claims as well as in the subsequent disclosure. Such preferred embodiments may also be applied in mutual combinations insofar as possible under technical considerations to any extent, even if not specified herein explicitly.

With the foregoing and other objects in view there is provided, in accordance with a first aspect of the invention, a door lock having a frame configured to be fixed to a housing of a household appliance and including a latch for cooperating with a clamp attached to a door pivotably connected to the housing and for locking the door by being inserted along an insertion direction, the latch being movable in a lock plane parallel to the insertion direction and including at least one first guiding pin slidable in a linear first guide section of a guide included in the frame, the first guide section being parallel to the insertion direction and including a stop point for the first guiding pin at a distal end defined by the insertion direction, and at least one second guiding pin slidable in a curved second guide section of the guide, the second guide section being curved parallel to the lock plane and outwardly from the insertion direction, and a spring device being attached between the frame and the latch and biasing the latch in the insertion direction. Further, the latch is U-shaped and includes a first tab configured for gripping the clamp by movement along the insertion direction, and a second tab configured for being pushed by the clamp by movement along the insertion direction, and the second guide section is curved by more than 90° and provides an arrest point for the second guiding pin at a petal end defined by the insertion direction.

With the objects of the invention in view, there is also provided, as a second aspect, a household appliance having a housing, a door pivotable around a door axis for closing the housing, and a door locking device for locking the door including the door lock according to the first aspect of the invention being fixed to the housing and a clamp fixed to the door for cooperating with the door lock, wherein the clamp includes an eyelet configured for cooperating with the latch in case of the door being opened by pushing the second tab for moving the second guiding pin from the arrest point, and by being gripped by the first tab for pulling the clamp along the insertion direction for the first guiding pin to reach the stop point and lock the door.

Advantages of the invention include simplicity in construction and ease of manufacture which are attained by providing only one latch instead of two striker devices, and shaping the latch in hook-fashion and the clamp cooperating with the latch in eyelet-fashion for providing a solid and reliable grip between the latch and the clamp. Simplicity of manufacture is also provided by having the latch move in a plane parallel to the direction of insertion which lends itself to a particularly compact space-saving construction. Reliability of function is also attained by providing an arrest point for the second guiding pin which defines an open position for the door lock that is stable over time.

Principally, the invention may be applied to any household appliance. In particular, the household appliance may be a laundry care machine such as a laundry washer or laundry dryer, a cooling appliance such as a refrigerator or a freezer, a cooking appliance such as an oven, a microwave device, or a steamer, and a dishwasher.

Applying the invention otherwise in a locking device of any housing with a swiveling door such as a cupboard or other piece of furniture, is not excluded.

In a preferred embodiment of the invention the second guide section is curved by between 100° and 150°. More preferred, is the second guide section being curved by about 120°.

In another preferred embodiment of the invention the second guide section is open against the insertion direction. Thereby advantage is taken from the fact that the second guiding pin being biased by the spring devices is forced against the guide's structural parts at a side limiting the guide in the insertion direction, making guiding devices in the opposite direction superfluous. Thereby the structure and construction of the frame is simplified, which may allow manufacturing the frame by injection molding with reduced further shaping effort.

In a further preferred embodiment of the invention the latch is placed adjacent to at least one inner side of the frame which is plane and parallel to the lock plane. Thereby the latch glides on an inner side as it moves, thereby even better defining its location within the door lock and improving reliability and durability of its function. It is more preferred if the latch is placed between two mutually parallel inner sides of the frame, thereby being retained in space from two opposite sides.

In an additional preferred embodiment of the invention the inner side is formed at a flat section of the frame, the guide is formed as a cut-out in the flat section, and the first guiding pin and the second guiding pin protrude through the guide and are exposed from the section at an outer side opposite to the inner side. Thereby a particularly robust guide is provided, improving retention and movement of the latch still more. It is more preferred if the spring device includes a helical spring having holders fastened to a lug fixed at the outer side and to the second guiding pin. Thereby proper function of both the latch and the spring device are ascertained. It is noted that fastening the helical spring to the second guide pin is not mandatory, since a third guide pin might be provided at the latch, and also configured to protrude through the guide for attaching the spring device. Applying the second guiding pin, however, simplifies construction and maintenance further.

In yet another preferred embodiment of the invention the first guide section and the second guide section are combined into a single structure for guiding both the first guiding pin and the second guiding pin. This also simplifies construction and manufacture. It is more preferred if the single structure is J-shaped.

In yet a further preferred embodiment of the invention, when the first guiding pin is located at or near the stop point each of the first tab and the second tab extends substantially orthogonal to the insertion direction; and when the second guiding pin is located at or near the arrest point each of the first tab and the second tab extends at an acute angle with the insertion direction, the acute angle opening backwards of the insertion direction, and the second tab being exposed by the first tab along the insertion direction. It is more preferred if the acute angle is between 45° and 60°. In such a configuration a reliable and well-defined closing of the door is provided by locating the first guiding pin properly at the stop point, and smooth interaction of the latch and the clamp is provided as the clamp is inserted in the insertion direction during closing of the door.

In yet an additional preferred embodiment of the invention the frame is enclosed by a casing fixed to the frame. Thereby the casing may serve for protecting the internals of the door lock during manufacturing, storing and forwarding to integration into a household appliance.

In still another preferred embodiment of the invention the clamp is configured for cooperating in case of the door being locked with the latch by pulling the first tab against the insertion direction by the eyelet and moving the second guiding pin to the arrest point for opening the door.

In still a further preferred embodiment of the invention the clamp is movably fixed to the door for aligning to the insertion direction upon being inserted into the door lock, thereby providing increased flexibility and reliability in closing the door by interacting the clamp with the door lock.

In still an additional preferred embodiment of the invention the door axis is orthogonal to the insertion direction. This provides an alignment between the door with the latch and the door lock which is particularly suitable for adopting the invention to opening and closing the door.

In again another preferred embodiment of the invention the household appliance including the door lock is embodied as a laundry care machine. It is more preferred if the household appliance is embodied as a laundry drying machine.

Other features which are considered as characteristic for the invention are set forth in the appended claims.

Although the invention is illustrated and described herein as embodied in a door lock for a household appliance and a household appliance having the door lock, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
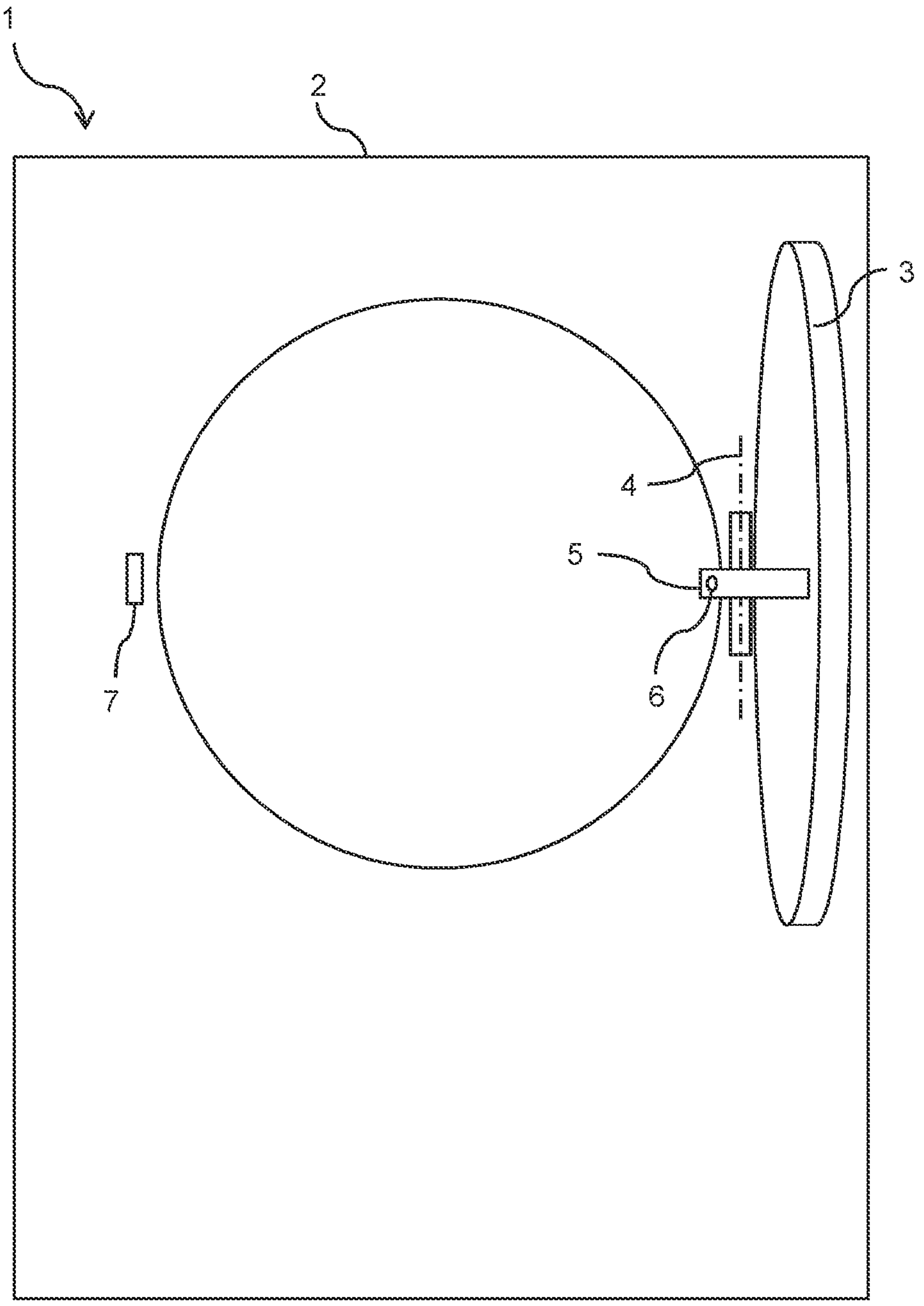
FIG. 1 is a diagrammatic, perspective view of a household appliance including a door lock.

Referring now to the figures of the drawings in detail and first, particularly, to FIG. 1 thereof, there is seen a household appliance 1 which is embodied as a laundry care machine 1, specifically as a laundry drying machine 1. The machine 1 includes a housing 2 having a circular access opening which is to be sealed by a door 3 pivotable around door axis 4. A clamp 5 having an eyelet 6 is attached to the door 3, with the clamp 5 provided for being inserted into a door lock 7 shown diagrammatically at the left of the access opening. A direction of insertion 12 of clamp 5 into door lock 7 is oriented orthogonally to the door axis 4, as shown in the figures subsequent to FIG. 1.

Function and applicability of household appliance 1 are not limited presently except by its suitability to have its door 3 locked by a door lock 7 as exhibited by the figures subsequent to FIG. 1. Of course, door lock 7 may be complemented by an electric switch or relay to be operated upon opening and/or closing door 3, or by an additional locking device preventing opening door 3 while household appliance 1 executes an operating process as provided for its regular use. Examples of such switch are a switch to terminate or suspend operation such as in a laundry dryer, or a switch enabling internal lighting in a refrigerator or freezer. Example of an additional locking device is such a locking device applied in a washing machine or washer-dryer for preventing opening while suds for washing or rinsing have been admitted into the appliance, and such locking device applied in an oven for preventing opening while a self-cleaning process such as pyrolysis treatment is operating in a kitchen oven.

Figure 2:
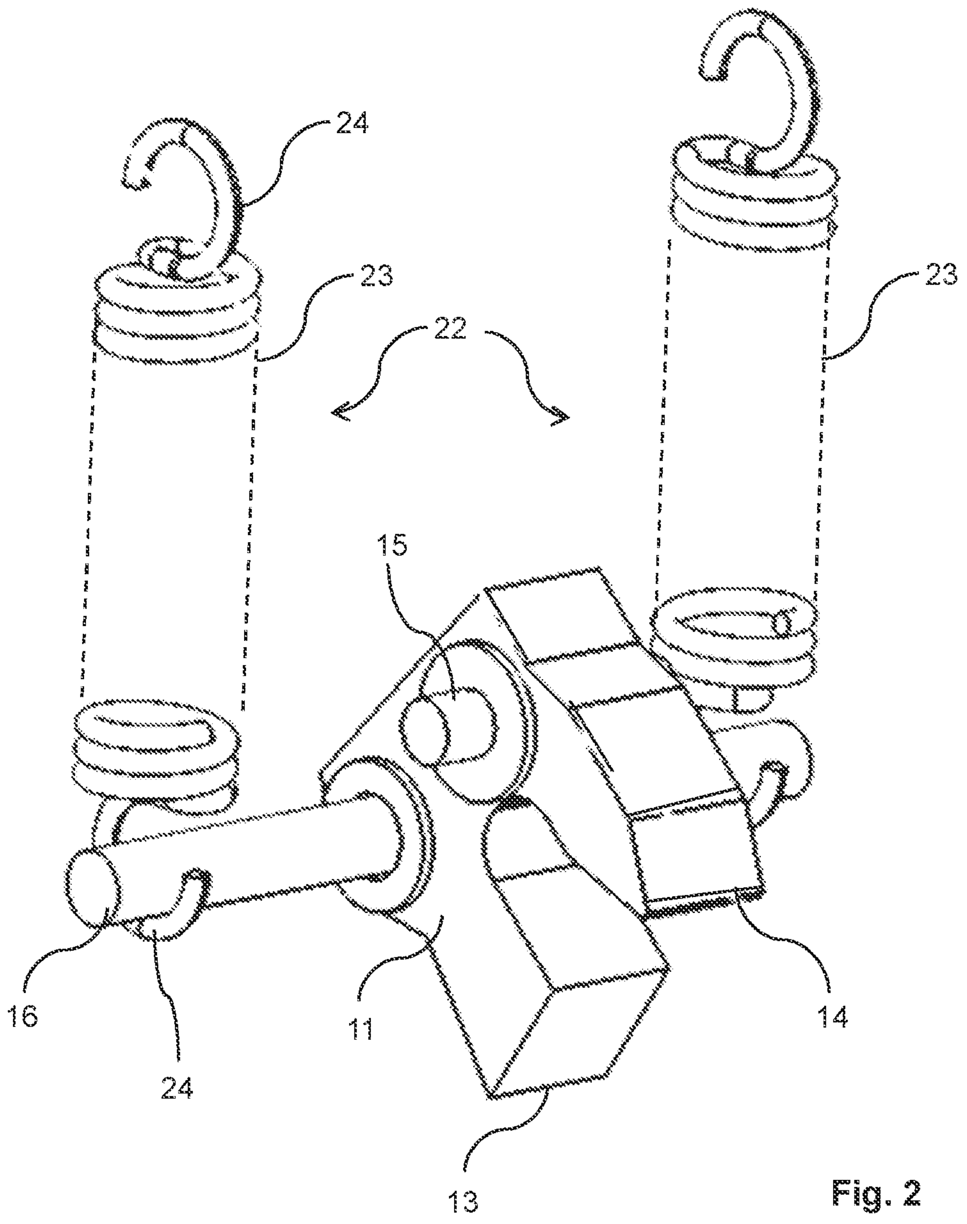
FIG. 2 is a perspective view of components of a door lock.

FIG. 2 exhibits several components of the novel door lock 7 as disclosed herein, including a latch 11 having a first tab 13 and a second tab 14 for cooperating with clamp 5 as mentioned above according to explanations following hereinbelow, and having first guiding pins 15 and second guiding pins 16 which are guided in a guide 17 for moving and rotating latch 11 as detailed hereinbelow. Spring devices 22 including helical springs 23 and holders 24 are attached to the second guiding pins 16 for biasing latch 11 in the direction of insertion 12 specifically as detailed hereinbelow.

Figure 3:
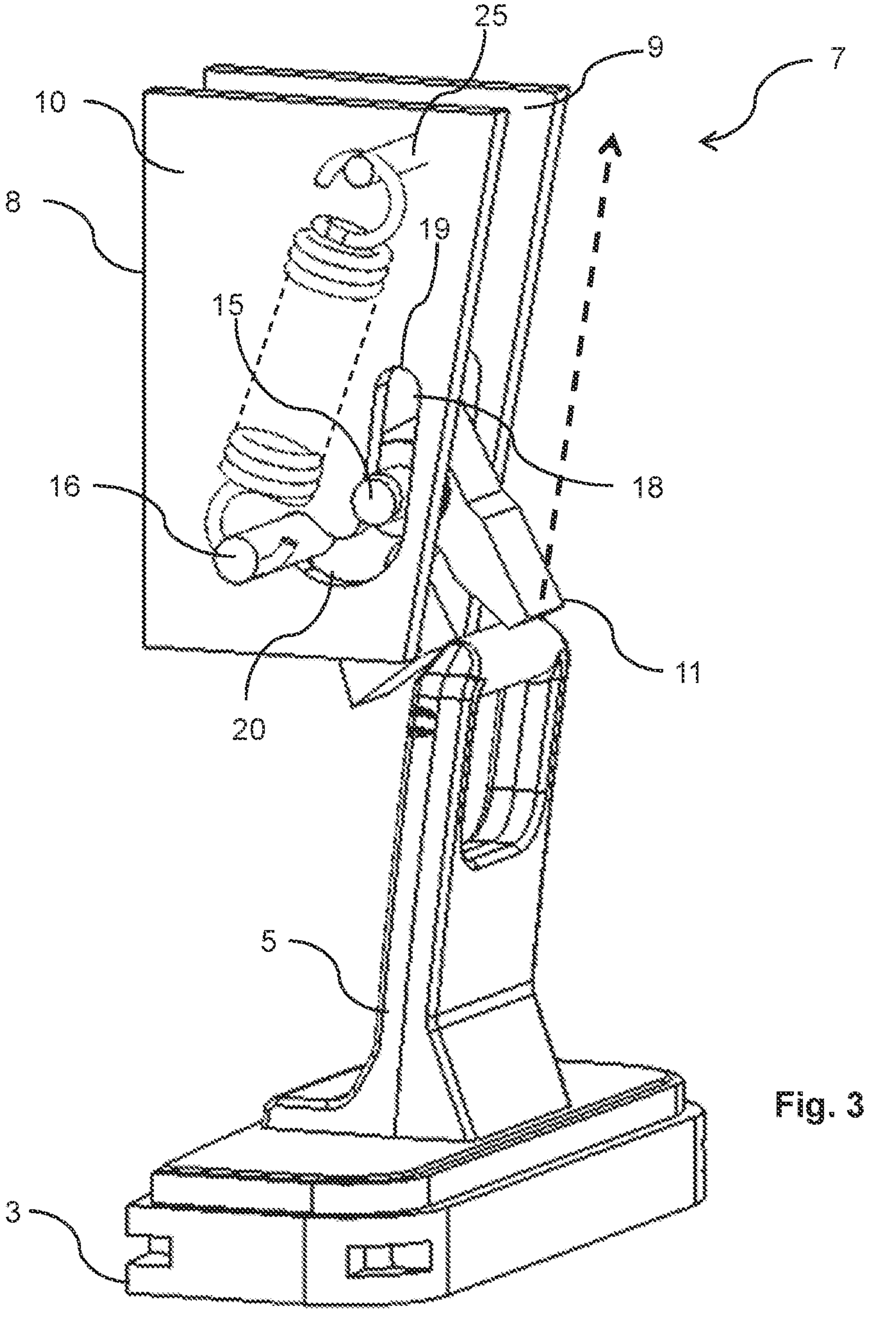
FIGS. 3, 4 and 5 are perspective views showing cooperational states of a door lock and a clamp.
Figure 4:
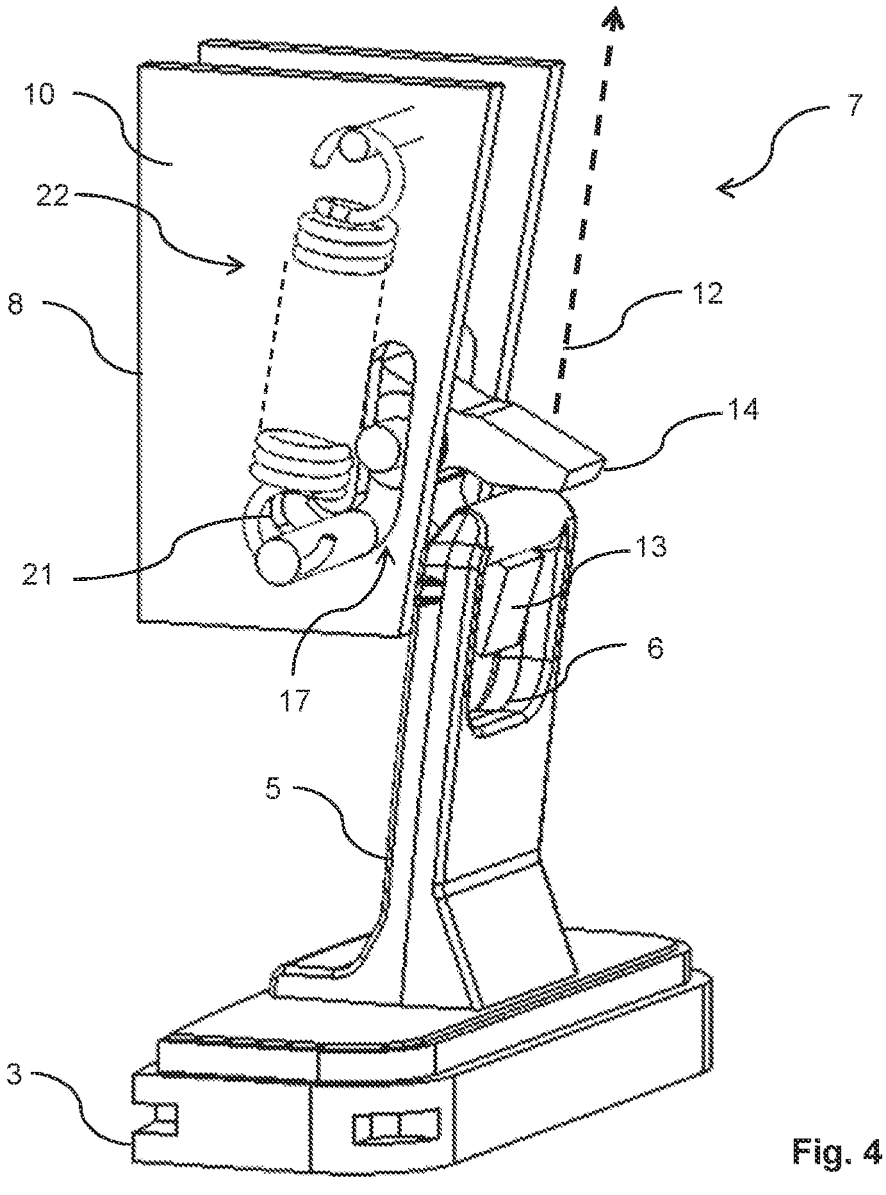
Figure 5:
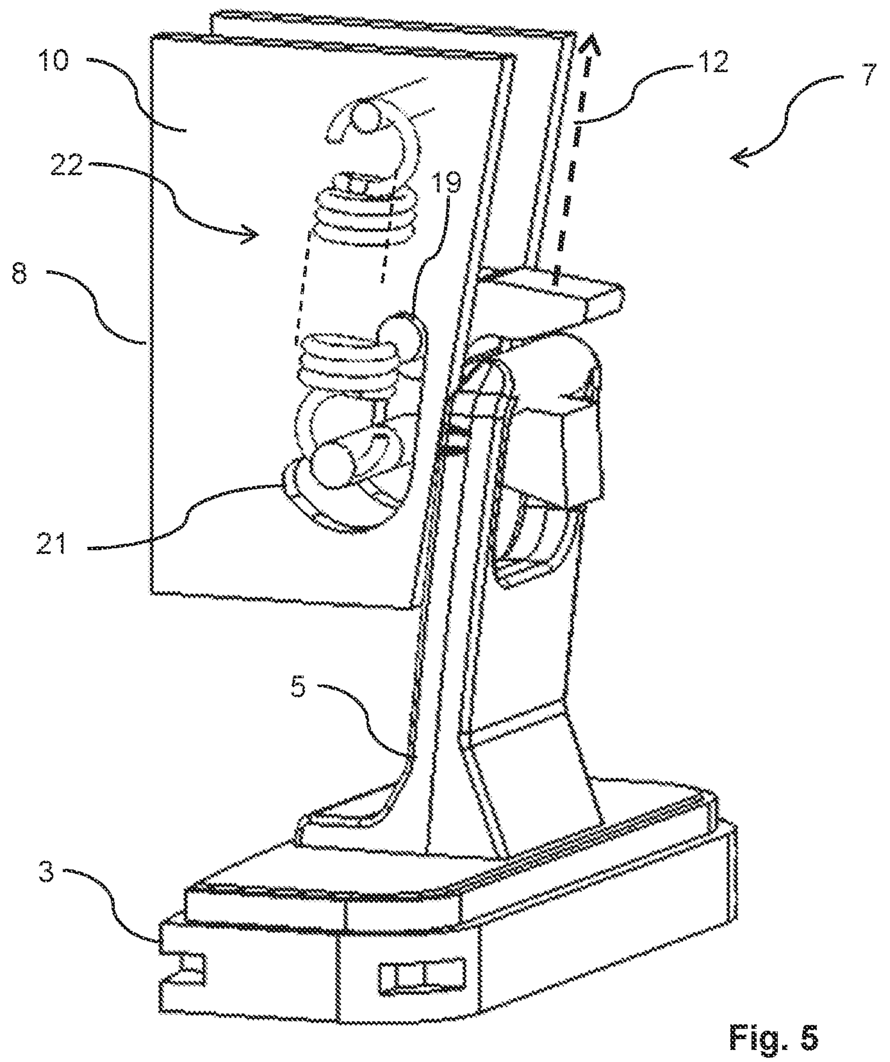

FIGS. 3, 4, and 5 exhibit cooperational states of door lock 7 and a clamp 5, with FIG. 3 showing the configuration in an open state of door lock 7 wherein door 3 is free to be swiveled around its door axis 4, FIG. 4 showing the same configuration in an intermediate state wherein clamp 5 is held by latch 11 to keep door 3 in a state near to being closed but being easily opened by a small force to be exerted by a user, and FIG. 5 showing the same configuration in a closed state wherein door 3 is closed with a considerable degree of security, and may be opened by a user by exerting a considerable but not so small force only.

According to FIGS. 3, 4 and 5, door lock 7 has a frame 8 configured to be fixed to housing 2 of household appliance 1 (see also FIG. 1) and includes latch 11 for cooperating with clamp 5 attached to door 3, door 3 being pivotably connected to housing 2, and for locking door 3 by being inserted along an insertion direction 12. In FIGS. 3 to 5 door 3 is represented by a foot associated with clamp 5 and to be anchored in door 3 as commonly known. Clamp 5 may be movable in the foot to some extent, allowing for alignment to door lock 7. Latch 11 is movable in a lock plane parallel to the insertion direction 12 and includes at least one first guiding pin 15 slidable in a linear first guide section 18 of a guide 17 included in frame 8. First guide section 18 is parallel to insertion direction 12 and includes stop point 19 for first guiding pin 15 at a distal end defined by the insertion direction 12. The at least one second guiding pin 16 is slidable in curved second guide section 20 of guide 17, second guide section 20 curved parallel to the lock plane and outwardly from insertion direction 12. Spring devices 22 are attached between frame 8 and latch 11, and biasing latch 11 in the insertion direction 12.

Latch 11 is U-shaped and includes a first tab 13 configured for gripping clamp 5 by movement along insertion direction 12, and a second tab 14 configured for being pushed by clamp 5 by movement along insertion direction 12. Second guide section 20 is curved by more than 90° and provides an arrest point 21 for second guiding pin 16 at a petal end defined by insertion direction 12.

Second guide section 20 is curved by between 100° and 150° in general, and by about 120° in particular. Thereby arrest point 21 is defined by the curvature of second guide section 20.

First guide section 18 and second guide section 20 may be concatenated or combined to a guide 17 being a single structure for guiding both a respective first guiding pin 15 and a respective second guiding pin 16, such as in FIGS. 3, 4 and 5. Alternatively first guide section 18 and second guide section 20 may also be separate from each other, provided that the geometry of latch 11 with placement of first guiding pins 15 and second guide pin 16 allowing. As readily apparent from FIGS. 3, 4 and 5, guide 17 is a J-shaped single structure.

Frame 8 which represents a section of door lock 7 which is immobile with respect to housing 2 and provides fastening and guidance to the movable components of door lock 7 may be provided so as to have latch 11 placed adjacent to at least one inner side 9 of frame 8 which is plane and parallel to the lock plane, or even placed between two mutually parallel inner sides 9 of frame 8 so as to provide full lateral enclosure of latch 11 by frame 8. Inner side 9 is formed at a flat section of the frame 8, guide 17 is formed as a cut-out in the flat section. First guiding pin 15 and the second guiding pin 16 protrude through guide 17 and are exposed from the section at an outer side 10 opposite to the inner side 9.

Spring devices 22 present as a pair in door lock 7 includes a helical spring 23 having holders 24 fastened to a lug 25 fixed at outer side 10 and to second guiding pin 16, respectively. In the embodiments shown spring devices 22 include helical springs 23 which provide bias force by being expanded. Of course, it is also possible to include helical springs 23 which are to be compressed for providing bias force, or other types of springs, as alternatives.

As readily apparent from FIG. 5 showing door lock 7 and clamp 5 in a closed state, when first guiding pin 15 is located at or near stop point 19 each of first tab 13 and second tab 14 extends substantially orthogonal to the insertion direction 12.

As readily apparent from FIG. 3 showing door lock 7 and clamp 5 in an open state, when second guiding pin 16 is located at or near arrest point 21 each of first tab 13 and second tab 14 extends at an acute angle with insertion direction 12, the acute angle opening backwards of insertion direction 12, and second tab 14 being exposed by first tab 13 along insertion direction 12. This acute angle may be between 45° and 60°.

Integrated into household appliance 1 of FIG. 1 are housing 2, door 3 pivotable around door axis 4 for closing the housing 2, and a door locking device for locking door 3 including door lock 7 as detailed hereinabove and fixed to housing 2, and clamp 5 fixed to door 3 for cooperating with door lock 7. Clamp 5 including eyelet 6 is configured for cooperating with latch 11 in case of door 3 being opened as in FIG. 3 by pushing second tab 14 for moving second guiding pin 11 from the arrest point 21, and by being gripped by first tab 13 for pulling clamp 5 along insertion direction 12 for first guiding pin 15 to reach stop point 19 and locking door 3.

Clamp 5 is also configured for cooperating in case of door 3 being locked with latch 11 as in FIG. 5 by pulling first tab 13 against insertion direction 12 by eyelet 6 and moving second guiding pin 11 to arrest point 21 for opening door 3.

Clamp 5 may be movably fixed to door 3 for aligning to insertion direction 12 upon being inserted into door lock 7.

While it is preferred to connect door 3 to household appliance 1 by having door axis 4 orthogonal to insertion direction 12, this is not mandatory, but deviations to the orthogonal may be applied as appropriate in the individual case.

As shown in FIGS. 6 to 9 the door lock 7 as described above may include a casing 26, with frame 8 enclosed by and fixed to casing 26. Casing 26 may provide an enclosure for the movable parts of door lock 7 and thus provide for protection against damage during manufacture, storing, transport and integration into a household appliance 1.

Figure 6:
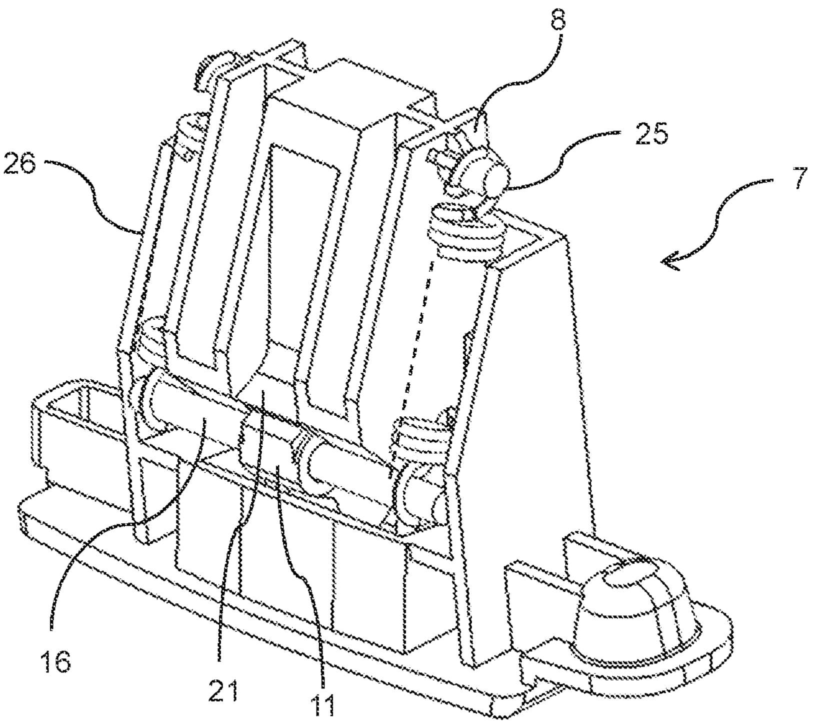
FIGS. 6 and 7 are perspective views of a door lock within a casing.
Figure 7:
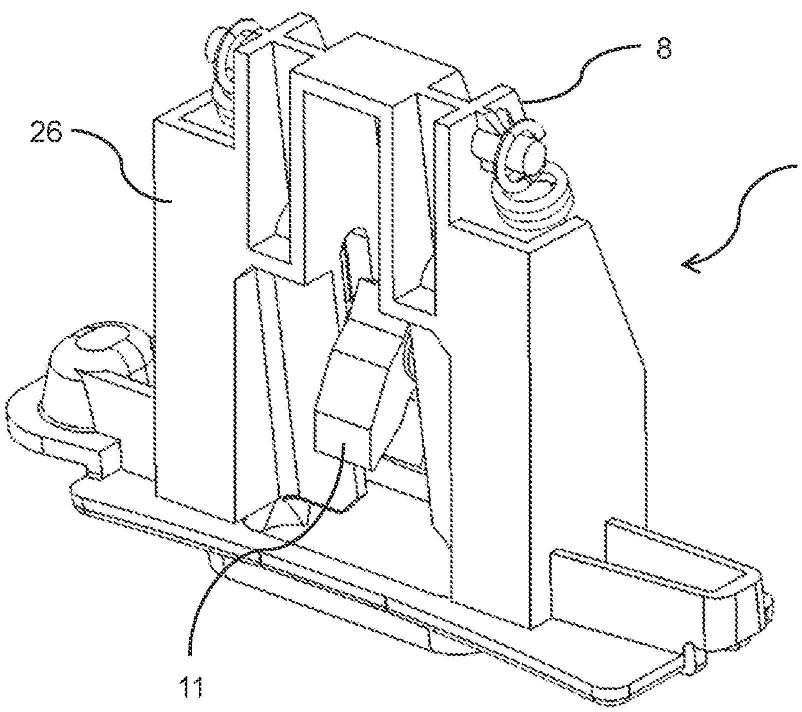
Figure 8:
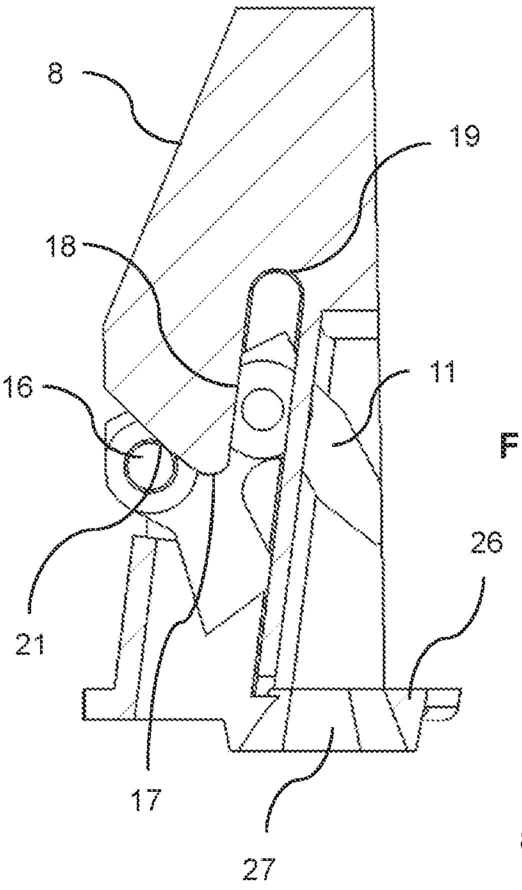
FIGS. 8 and 9 are elevational views of an alternative embodiment of a door lock.
Figure 9:
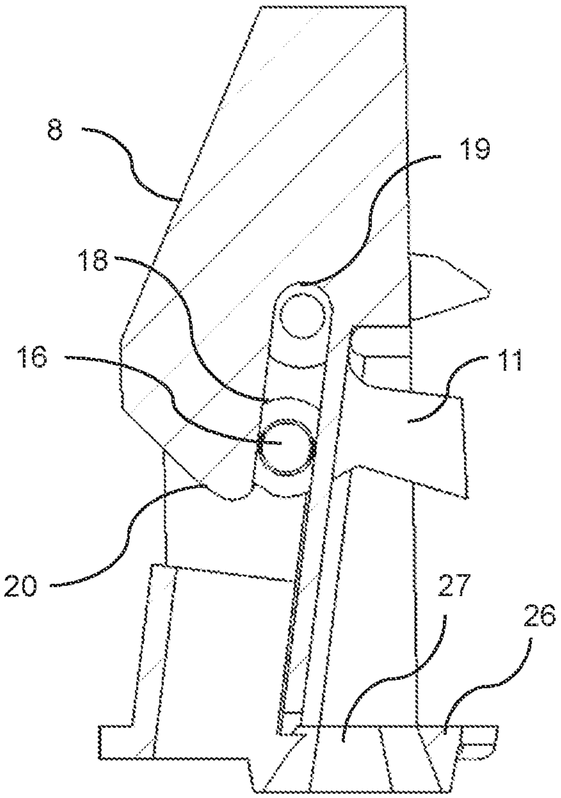

FIGS. 6 to 9 in general and FIGS. 8 and 9, in particular, exhibit a variant of door lock 7 of FIGS. 3, 4 and 5, wherein second guide section 20 is open against insertion direction 12. In this embodiment, advantage is taken of the biasing of latch 11 in the insertion direction 12 by spring devices 22, although the latter are not shown in FIGS. 8 and 9. Due to such a bias, second guiding pin 16 is forced against frame 8 as readily apparent from FIG. 8 that shows second guiding pin 16 to rest at arrest point 21. In this variant and as best seen in FIG. 6, arrest point 21 is not provided by and end of guide 17 but by an edge provided in casing 26 which is contacted by latch 11 in its open state. As apparent from FIG. 9, when arrived in first guide section 18 however, second guiding pin 16 receives pull by spring devices 22 along second guide section 18, thereby necessitating guidance by two sides in guide 17.

Door lock 7 of FIGS. 8 and 9 is also enclosed by casing 26, though casing 26 is shown only fragmentarily. Yet casing 26 includes an insertion opening 27 placed below latch 11 as seen along insertion direction 12, insertion opening 27 serving as a guiding and alignment device for clamp 5 to enter door lock 7.

Advantages of the novel door lock 7 include simplicity in construction and ease of manufacture attained by providing only one latch 11 for engaging clamp 5, and shaping latch 11 in hook-fashion, and clamp 5 cooperating with latch 11 by eyelet 6 for providing a solid and reliable grip between latch 11 and clamp 5. Simplicity of manufacture is also provided by having latch 11 move in a plane parallel to insertion direction 12, which lends itself to a particularly compact space-saving construction. Reliability of function is also attained by providing arrest point 21 for second guiding pin 16 which defines an open position for door lock 7 that is reliably stable over time.

The following is a summary list of reference numerals and the corresponding structure used in the above description of the invention.

LIST OF REFERENCE NUMERALS

1 Household appliance
2 Housing
3 Door
4 Door axis
5 Clamp
6 Eyelet
7 Door lock
8 Frame
9 Inner side
10 Outer side
11 Latch
12 Insertion direction
13 First tab
14 Second tab
15 First guiding pin
16 Second guiding pin
17 Guide
18 First guide section
19 Stop point
20 Second guide section
21 Arrest point
22 Spring device
23 Helical spring
24 Holder
25 Lug
26 Casing
27 Insertion opening

The invention claimed is:

1. A door lock, comprising:

a frame configured to be fixed to a housing of a household appliance, said frame including a guide having a linear first guide section being parallel to an insertion direction, said linear first guide section including a stop point at a distal end defined by said insertion direction, and said frame including a curved second guide section parallel to a lock plane, said curved second guide section being curved outwardly from said insertion direction by more than 90° relative to said linear first guide section, said second guide section having an arrest point at a petal end defined by said insertion direction;

a U-shaped latch for cooperating with a clamp attached to a door pivotably connected to the housing for locking the door by inserting the clamp in said U-shaped latch along said insertion direction;

said U-shaped latch being movable in said lock plane parallel to said insertion direction, said U-shaped latch including at least one first guiding pin slidable in said linear first guide section and being stopped by said stop point, and said U-shaped latch including at least one second guiding pin slidable in said curved second guide section and stopped at said arrest point;

said U-shaped latch including a first tab configured for gripping the clamp by movement along said insertion direction, and a second tab configured for being pushed by the clamp by movement along said insertion direction; and a spring device attached between said frame and said U-shaped latch and biasing said U-shaped latch in said insertion direction.

2. The door lock according to claim 1, wherein said second guide section is curved by between 100° and 150°.

3. The door lock according to claim 2, wherein said second guide section is curved by approximately 120°.

4. The door lock according to claim 1, wherein said second guide section is open against said insertion direction.

5. The door lock according to claim 1, wherein said frame has at least one inner side being plane and parallel to said lock plane, and said U-shaped latch is placed adjacent to said at least one inner side.

6. The door lock according to claim 5, wherein said at least one inner side of said frame includes two mutually parallel inner sides, and said U-shaped latch is placed between said two mutually parallel inner sides of said frame.

7. The door lock according to claim 6, wherein:

said frame includes a flat section and an outer side opposite to said inner side;

said inner side is formed at said flat section;

said guide is formed as a cut-out in said flat section; and said first guiding pin and said second guiding pin protrude through said guide and are exposed from said flat section at said outer side of said frame.

8. The door lock according to claim 7, which further comprises a lug fixed at said outer side of said frame, said spring device including a helical spring having holders respectively fastened to said lug and to said second guiding pin.

9. The door lock according to claim 1, wherein said first guide section and said second guide section are combined into a single structure for guiding both said first guiding pin and said second guiding pin.

10. The door lock according to claim 9, wherein said single structure is J-shaped.

11. The door lock according to claim 1, wherein:

when said first guiding pin is located at or near said stop point, each of said first tab and said second tab extends substantially orthogonal to said insertion direction; and when said second guiding pin is located at or near said arrest point, each of said first tab and said second tab extends at an acute angle with said insertion direction, said acute angle opening backwards of said insertion direction, and said second tab being exposed by said first tab along said insertion direction.

12. The door lock according to claim 11, wherein said acute angle is between 45° and 60°.

13. The door lock according to claim 1, which further comprises a casing fixed to said frame and enclosing said frame.

14. A household appliance, comprising:

a housing;

a door pivotable around a door axis for closing said housing;

a door locking device for locking said door, said door locking device including the door lock according to claim 1 being fixed to said housing;

a clamp fixed to said door for cooperating with said door lock, said clamp including an eyelet configured for cooperating with said latch upon said door being opened by said eyelet pushing said second tab for moving said second guiding pin from said arrest point, and by said eyelet being gripped by said first tab for pulling said clamp along said insertion direction for said first guiding pin to reach said stop point and lock said door.

15. The household appliance according to claim 14, wherein said clamp is configured for cooperating with said latch upon said door being locked by said eyelet pulling said first tab against said insertion direction and moving said second guiding pin to said arrest point for opening said door.

16. The household appliance according to claim 15, wherein said clamp is movably fixed to said door for alignment with said insertion direction upon being inserted into said door lock.

17. The household appliance according to claim 14, wherein said door axis is orthogonal to said insertion direction.

18. The household appliance according to claim 14, wherein the household appliance is a laundry care machine.

19. The household appliance according to claim 18, wherein the laundry care machine is a laundry drying machine.

* * * * *